US006922633B2

(12) United States Patent
Takenaka (10) Patent No.: US 6,922,633 B2
(45) Date of Patent: Jul. 26, 2005

(54) NAVIGATION DEVICE AND METHOD OF SEARCHING ROUTE (75) Inventor: Shoichiro Takenaka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 114 days.

(21) Appl. No.: 10/317,173

(22) Filed: Dec. 12, 2002

(65) Prior Publication Data
US 2004/0215388 A1 Oct. 28, 2004

(30) Foreign Application Priority Data
Dec. 20, 2001 (JP) ........................ 2001-387995

(51) Int. Cl.[7] .................. G06F 19/00; G01C 21/34
(52) U.S. Cl. .................. 701/209; 340/995.19; 340/994; 340/988; 342/357.06; 180/65.3
(58) Field of Search ................. 701/209, 201, 701/200, 210, 211, 204; 340/990, 995, 995.1, 994, 995.19, 995.24, 995.27, 996, 995.14, 995.23, 988, 995.18; 345/772, 788; 342/357.06, 357.1, 357.08, 357.09; 180/65.3

(56) References Cited

U.S. PATENT DOCUMENTS

| 5,491,636 | A | * | 2/1996 | Robertson et al. .......... 342/357 |
| 6,125,323 | A | * | 9/2000 | Nimura et al. .............. 701/207 |
| 6,433,677 | B1 | * | 8/2002 | Flick ........................ 340/426 |
| 6,449,472 | B1 | * | 9/2002 | Dixit et al. ................. 455/404 |
| 6,587,040 | B2 | * | 7/2003 | Seto ........................ 340/426.1 |
| 6,587,782 | B1 | * | 7/2003 | Nocek et al. ............... 701/200 |
| 6,611,742 | B1 | * | 8/2003 | Sand et al. ................... 701/36 |
| 2001/0026240 | A1 | * | 10/2001 | Neher ................... 342/357.01 |
| 2002/0133292 | A1 | * | 9/2002 | Miyaki ....................... 701/209 |
| 2002/0161521 | A1 | * | 10/2002 | Abe et al. ................... 701/213 |
| 2002/0165661 | A1 | * | 11/2002 | Horikami ................... 701/200 |
| 2002/0167408 | A1 | * | 11/2002 | Trajkovic et al. ......... 340/573.1 |
| 2002/0167442 | A1 | * | 11/2002 | Taylor .................... 342/357.09 |
| 2002/0183924 | A1 | * | 12/2002 | Yokota ....................... 701/209 |
| 2003/0028318 | A1 | * | 2/2003 | Kaji et al. .................. 701/209 |
| 2003/0069690 | A1 | * | 4/2003 | Correia et al. ............. 701/211 |
| 2004/0049335 | A1 | * | 3/2004 | Schmidt et al. ............. 701/201 |

FOREIGN PATENT DOCUMENTS

JP 11-304505 A 11/1999

* cited by examiner

Primary Examiner—Thomas G. Black
Assistant Examiner—Tuan C To
(74) Attorney, Agent, or Firm—Birch, Stewart, Kolasch & Birch, LLP (57) ABSTRACT A navigation device includes a scenic information searching unit for searching for drop-in information about a favorable place for drop-in around a guide route leading from a departing place to a destination based on the drop-in information set in acquired map data. A route searching unit searches for the guide route via a drop-in route running through the favorable place for the drop-in based on the drop-in information searched by the surrounding drop-in information searching unit and calendar information detected by the time computing unit.

19 Claims, 7 Drawing Sheets

LINK TABLE

| START END NODE | TERMINAL END NODE | LINK LENGTH (m) | ROAD WIDTH (m) | LINK COST | SCENIC FLAG | SCENIC INFORMATION | | |
|---|---|---|---|---|---|---|---|---|
| | | | | | | BEST PERIOD /TIME | NAME | COST REDUCTION COEFFICIENT |
| 1 | 2 | 350 | 10 | 35 | NO | | | |
| 2 | 3 | 300 | 10 | 30 | NO | | | |
| 2 | 4 | 500 | 10 | 50 | YES | 4/1~4/10 | CHERRY-TREE-LINED STREET | 0.8 |
| 2 | 5 | 900 | 10 | 90 | NO | | | |
| 3 | 5 | 700 | 10 | 70 | NO | | | |
| 4 | 5 | 500 | 10 | 50 | YES | 4/1~4/10 | CHERRY-TREE-LINED STREET | 0.8 |
| 5 | 6 | 500 | 10 | 50 | NO | | | |
| ... | ... | ... | ... | ... | ... | ... | ... | ... |

FIG.7

TABLE OF COST REDUCTION COEFFICIENT
FOR EACH KIND OF ADJACENT SCENIC SPOT

| KIND OF SCENIC SPOT | BEST PERIOD/TIME | COST REDUCTION COEFFICIENT |
|---|---|---|
| VARIOUS KINDS OF LANDMARK | ALWAYS | 0.9 |
| PLACE OF BEAUTIFUL NIGHT SCENE | NIGHT TIME | 0.8 |
| PARK WITH CHERRY TREES | 4/1～4/10 | 0.8 |
| ⋮ | ⋮ | ⋮ |

FIG.8

SET ALLOWABLE
DETOUR AMOUNT

DETOUR TIME ⇒ 110% ⇕ —— 81
DETOUR DISTANCE ⇒ 120% ⇕ —— 82

ENTER

FIG.9 (PRIOR ART)

NAVIGATION DEVICE AND METHOD OF SEARCHING ROUTE

This nonprovisional application claims priority under 35 U.S.C. §119(a) on patent application Ser. No. 2001-387995 filed in JAPAN on Dec. 20, 2001, which is herein incorporated by reference.

BACKGROUND OF THE INVENTION

1. Field of the Invention

This invention relates to a navigation device which, considering conditions of the destination inclusive of the season, time, etc, makes a route searching depending on the conditions, as well as to a method of searching a route.

2. Description of Related Art

Figure 9:
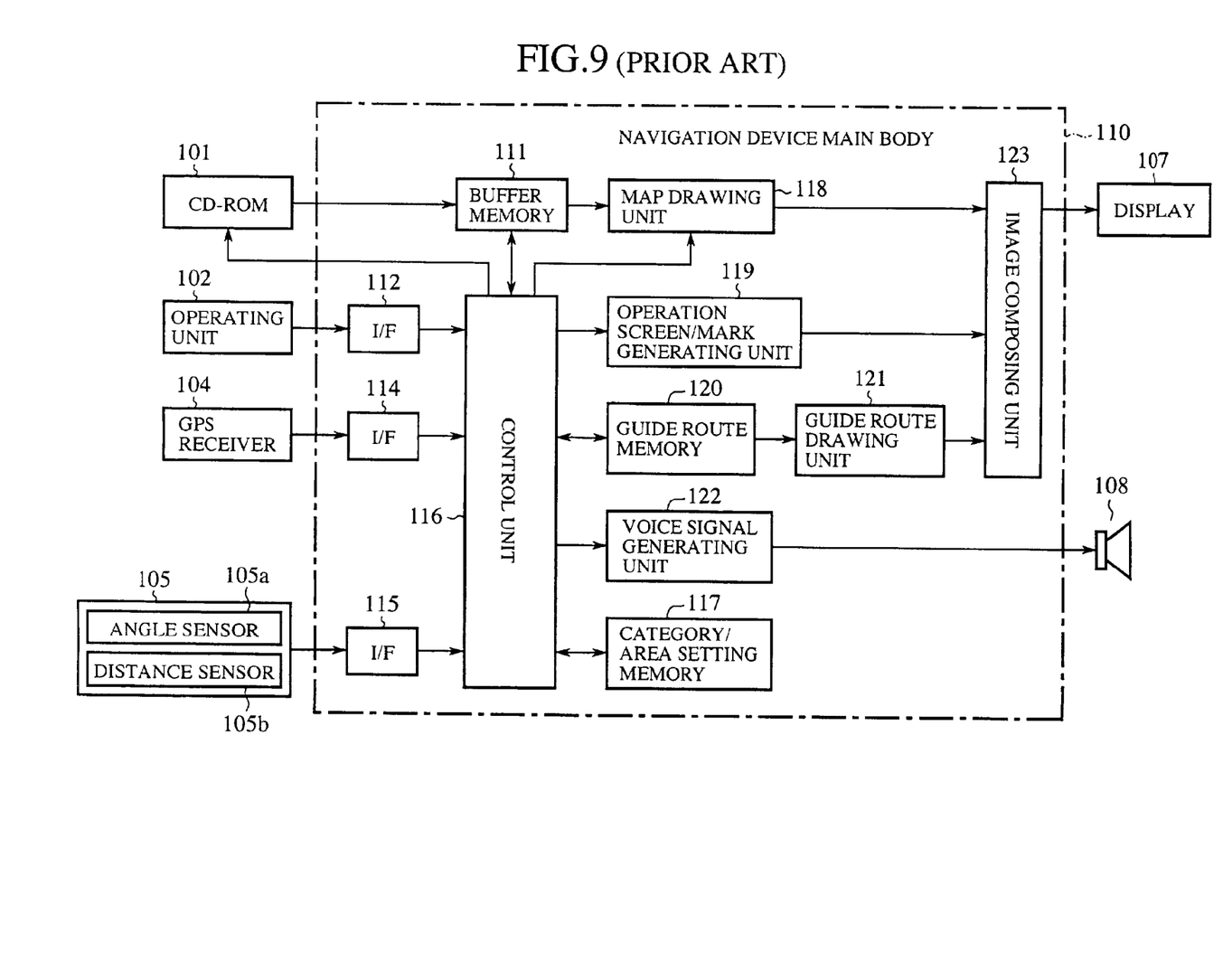
FIG. 9 is a block diagram showing a configuration of the conventional navigation device.

FIG. 9 is a block diagram showing the conventional navigation device disclosed in Published Unexamined Japanese Patent Application No. 304505/1999.

Referring to FIG. 9, reference numeral 101 denotes a compact disc read only memory (CD-ROM) which stores therein map data, 102 denotes an operating unit, and 104 denotes a global positioning system (GPS) receiver which receives GPS signals transmitted from GPS satellites to thereby detect the latitude and longitude of the current position of a vehicle. Reference numeral 105 denotes an autonomous navigation sensor, 105a denotes an angle sensor, 105b denotes a travel distance sensor, 107 denotes a display using liquid crystal, 108 denotes a speaker, and 110 denotes a navigation device main body. Reference numeral 111 denotes a buffer memory which temporarily stores therein map display read out from the CD-ROM 101, 112 denotes an interface which sends and receives data between the operating unit 102 and a control unit 116, 114 denotes an interface which sends and receives data inclusive of the latitude and longitude of the current position between the GPS receiver 104 and the control unit 116, and 115 denotes an interface which connects the autonomous navigation sensor 105 and the control unit 116. Reference numeral 117 denotes a category/area setting memory, 118 denotes a map drawing unit, 120 denotes a guide route memory, and 121 denotes a guide route drawing unit. Reference numeral 119 denotes an operating screen/mark generating unit, 122 denotes a voice signal generating unit, and 123 denotes an image composing unit.

The operation of the conventional navigation device will now be described.

This navigation device has a function of searching a route running through a scenic spot and a function of searching for routes such as a travel service for guiding a number of such places in succession. When a user has designated a drop-in guide route searching, it starts searching for candidates for drop-in according to user's preference. If the user has designated a desired facility as a drop-in destination among the candidates for drop-in, the route of the lowest cost among the routes running through the designated facility is searched to adopt it as a guide road.

Since the conventional navigation device is configured as described above, in case a route search is made by setting an ordinary destination other than sightseeing, a search is made for the route through which a user can be reached the destination in the shortest time and at the shortest distance. Therefore, the route running through the scenic spot is seldom searched where the user can enjoy beautiful scenery. In case one wishes to enjoy sightseeing while driving a vehicle, a route through which the user can enjoy the beautiful sceney is not searched unless the setting is manually made of the destination and the passing points.

SUMMARY OF THE INVENTION

This invention has been made to solve the above and other problems and has an object of providing a navigation device capable of automatically searching for favorable places for drop-in adjacent to a guide route leading from a departing place to a destination.

The navigation device according to this invention includes surrounding drop-in information searching means for searching for drop-in information about favorable places for drop-in around a guide route leading from a departing place to a destination based on the drop-in information set in the map data acquired by map data acquiring means, and route searching means searches for the guide route leading from the departing place to the destination via a drop-in route running through favorable places for drop-in, based on the drop-in information searched by the surrounding drop-in information searching means and calendar information detected by the calendar information detecting means.

Further, the method of searching a guide route according to this invention includes the steps of searching for drop-in information about favorable places for drop-in around the guide route leading from the current position to the destination based on the drop-in information set in map data, and searching for a guide route via the drop-in route running through the favorable place for drop-in based on the surrounding drop-in information searched at the guide route searching step and calendar information.

Therefore, without manually setting the drop-in place as the destination and the passing points, the user can automatically search for a guide route via the drop-in route running through the favorable place for drop-in adjacent to the guide route leading from the departing place to the destination.

BRIEF DESCRIPTION OF THE DRAWINGS

The above and other objects and the attendant advantages of the current invention will become readily apparent by reference to the following detailed description when considered in conjunction with the accompanying drawings wherein.

DETAILED DESCRIPTION OF A PREFERRED EMBODIMENT

A description will hereinbelow be made about a preferred embodiment of carrying out this invention.

First Embodiment

The first embodiment is directed to a navigation device and a method of searching a route which, when a search is made for the route to the set destination, enables an automatic search for a route via a scenic spot so as to present it to the user. In order to implement this kind of function, a function is utilized for searching a number of routes together with time-priority and distance-priority functions, which are provided in a recent navigation device. In this manner, routes running through scenic spots such as a road extending along a coast, a tree-lined street, or the like and is, as an option in selecting a road by a user, presented to the user. The user then selects a desired route out of the searched result so that a comfortable route guidance can be given depending on the conditions inclusive of the place, time, etc.

In order to implement this kind of function in the navigation device, scenic road information indicative of the scenic roads is stored in road information of the memory medium in which are stored the map database to be used in searching for the routes. Then, the scenic road information is referred to by the control program built in the control device of the navigation device.

The database to be used in the navigation device represents an intersection on an actual road by a dot (hereinbelow referred to as a node) and the road connecting the nodes is represented by a line (hereinafter referred to as a link), whereby the actual road network is represented. In the case where a road search is made by the navigation device leading from the departing place to the destination, numerical values stored in the map database to indicate how far the user, expressed on the basis of the road width, the number of lanes, the road length, etc, can have a nice driving on the candidate road (link). These values are called as link costs or simply cost.

Figure 1:
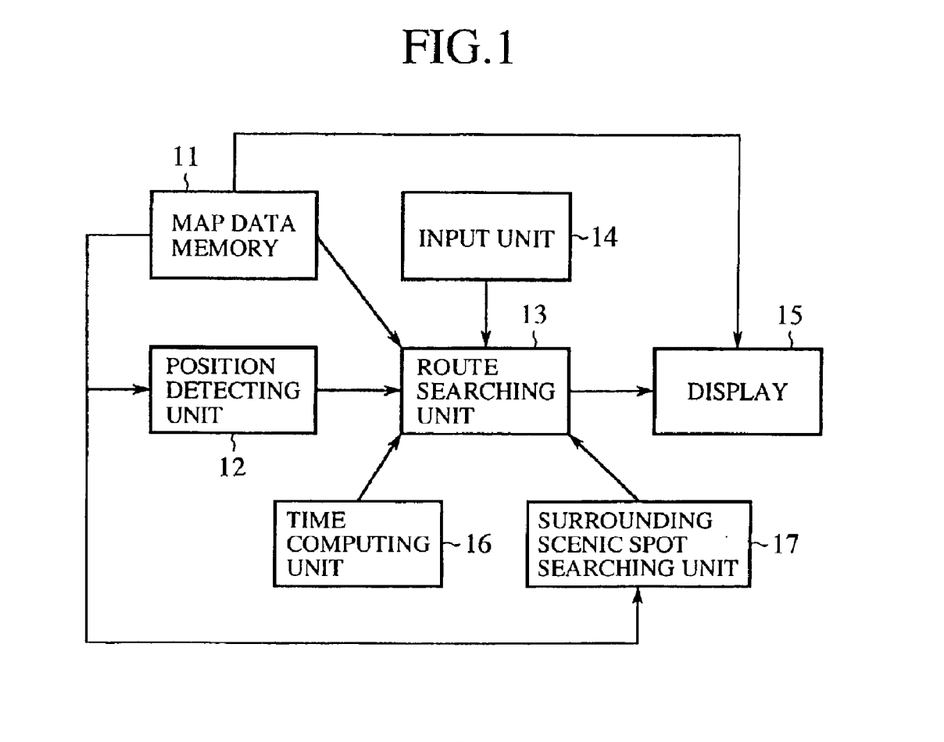
FIG. 1 is a block diagram showing a configuration of the navigation device to which is applied a method of searching a route of first embodiment.

FIG. 1 is a block diagram showing the configuration of the navigation device to which is applied a method of searching a route in the first embodiment.

Referring to FIG. 1, reference numeral 11 denotes a map data memory (map data acquiring means) in which are stored a variety of information inclusive of map data such as the information about the roads, about the facilities (kind, name, position, telephone number, etc), and about the scenic spots that are the drop-in information. Reference numeral 12 denotes a position detecting unit (position detecting means) for detecting the current position of the vehicle based on the output data from a global positioning system (GPS) receiver and various sensors. Reference numeral 13 denotes a route searching unit (route searching means) for searching for the routes leading from the current position (departing place) acquired by the position detecting unit 12 to the destination inputted by the operation of the user using the input unit (input means) 14 based on the various data stored in the map data memory 11. Reference numeral 15 denotes a display (output means) for performing a route guidance by displaying the result of searches for the routes or prompting the user to select various menu items. Reference numeral 16 denotes a time computing unit (calendar information detecting means) for acquiring the calendar information inclusive of the current year, month, day, time and season, the day of the week, or the time period from the GPS signal, or from a built-in clock in the navigation device. Reference numeral 17 denotes a surrounding scenic spot searching unit (surrounding drop-in information searching means) for searching for the surrounding scenic spots adjacent to the candidate roads from the map data memory 11 in searching the route leading from the current position to the destination.

Figure 2:
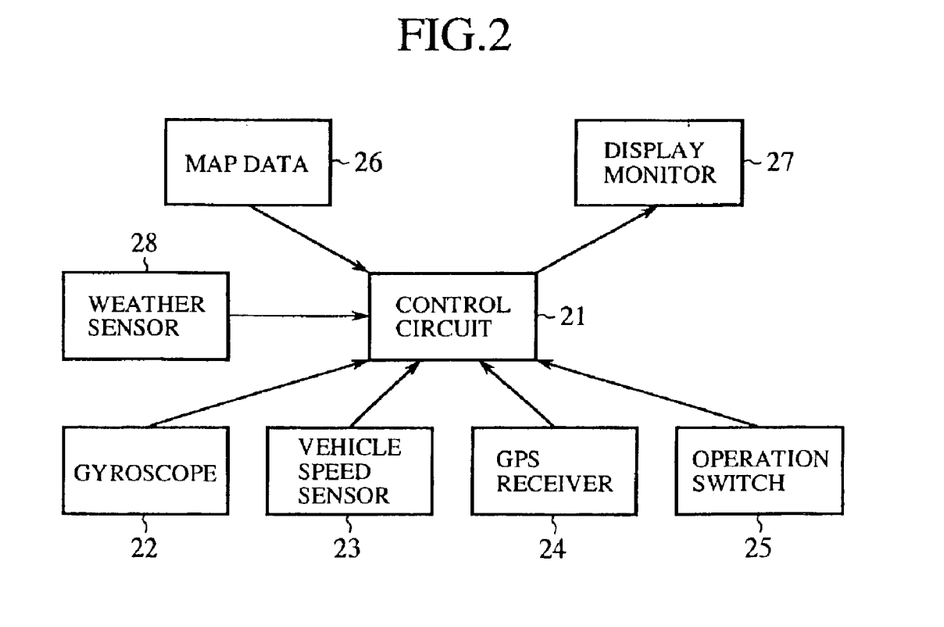
FIG. 2 is a block diagram showing a hardware configuration of the navigation device.

FIG. 2 is a block diagram showing the hardware configuration of the navigation device in the first embodiment.

Referring to FIG. 2, reference numeral 21 denotes a control circuit (route searching means, surrounding drop-in information searching means) for performing various computations and a control of the entire navigation device, which is made up, e.g., of a microcomputer, a read-only memory (ROM), random-access memory (RAM), etc. The functions of the route searching unit 13, the route guiding unit, and the display, etc shown in FIG. 1 are respectively implemented as the functions immanent in the control circuit 21.

Reference numeral 22 denotes a direction sensor (position detecting means), a gyroscope, for detecting an azimuth of the vehicle. Reference numeral 24 denotes a vehicle speed sensor (position detecting means) for detecting the traveling speed of the vehicle. Reference numeral 24 denotes a GPS receiver (position detecting means) for detecting the current position of the vehicle by receiving the radio waves of the GPS signals transmitted from the GPS satellites. Reference numeral 25 denotes input means, such as a joy stick or a button, operated by the user, which corresponds to the input unit 14 in FIG. 1. Reference numeral 26 denotes read-only memories (ROMs) such as a compact-disc read-only memory (CD-ROM) or a digital versatile disc read-only memory (DVD-ROM); drivers such as a CD-ROM drive, a DVD-ROM drive, or a hard disc drive that reads out various data containing the map data or the scenic information, the drop-in information, about favorable drop-in place from the map database provided in the memory media; and various memories (map data acquiring means) for temporarily storing therein the various data read out from the CD-ROM or DVD-ROM, which corresponds to the map data memory 11. Reference numeral 27 denotes a display monitor (output means) for displaying the map around the current position, the result of route search, the route guiding state, etc, which corresponds to the display 15 in FIG. 1. Reference numeral 28 denotes a weather sensor (weather detecting means) for detecting the weather such as fine, cloudy, rainy, snowy, etc.

Figure 5:
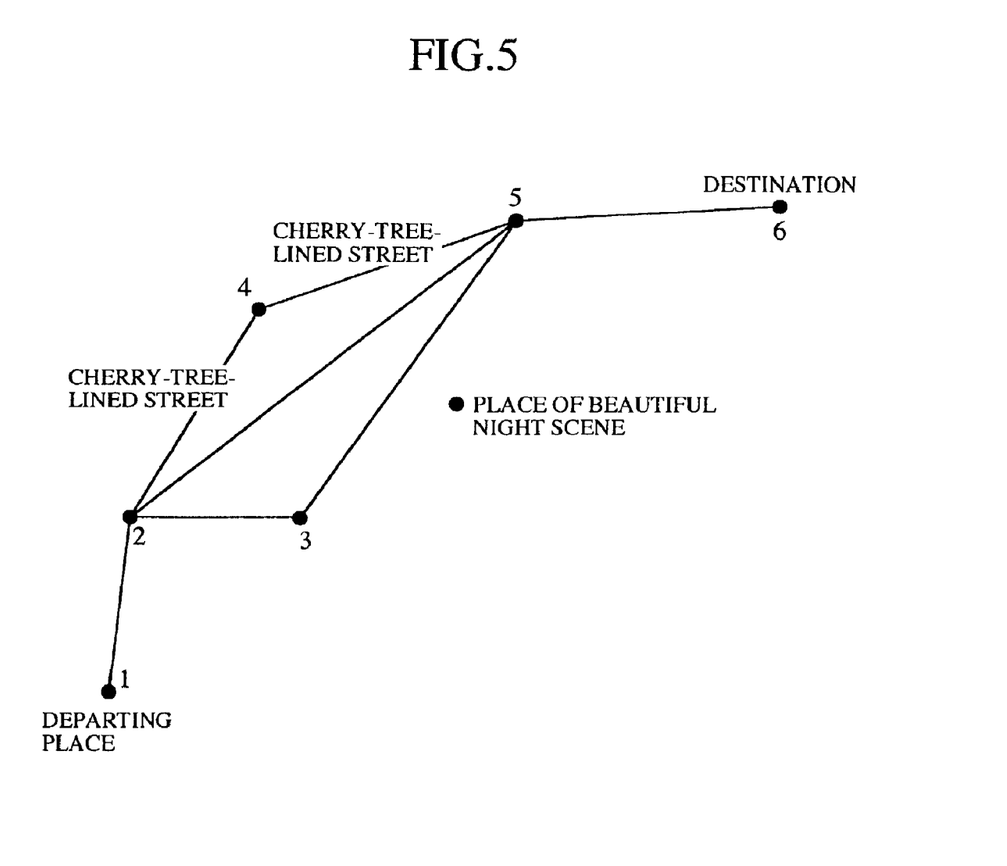
FIG. 5 is an explanatory drawing of a route for specifically explaining the cost required for a search for a route in the navigation device.
Figure 6:
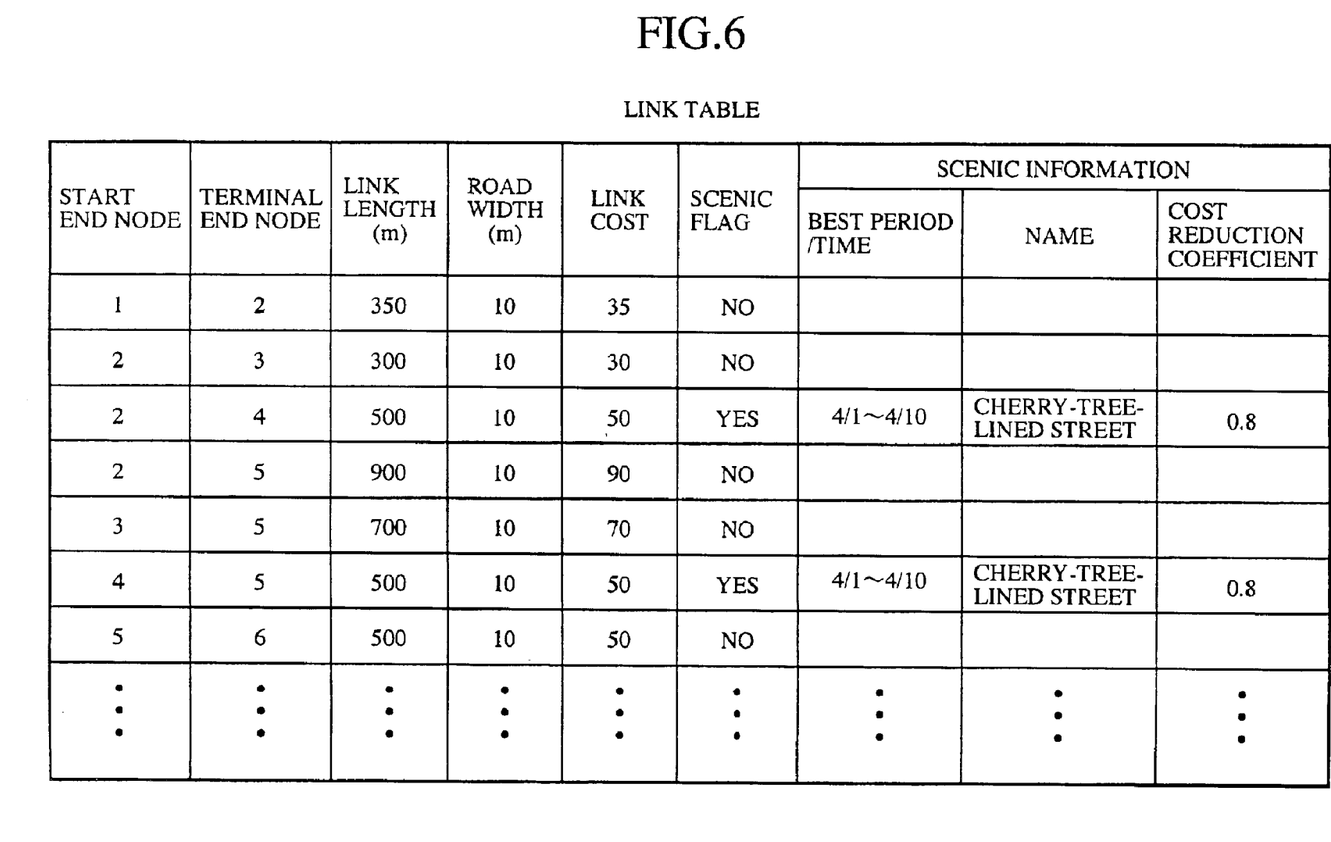
FIG. 6 is a table showing an example of a map format of a map database in the navigation device.

FIG. 6 is a table showing an example of the map format of the map database, and FIG. 5 is an explanatory drawing of the route corresponding to FIG. 6.

In FIG. 5, a solid black circle (●) indicates a node and the line a link. The start end node, terminal end node, link length, road width, link cost, and scenic flag are listed on the table in FIG. 6. In addition, in case the scenic flag is "YES" indicative of the presence of the scenic information, the time period/time at which a scene is in its best season to see, name, cost reduction coefficient for scenic spot of the corresponding link. The cost reduction coefficient in FIG. 6 is a coefficient for, in searching for the scenic route, more facilitating the selection of the scenic route than usual by decreasing the cost of a scenic route than the prescribed value.

The cost reduction coefficient in FIG. 6 is determined on the basis of the kind and scale of the parallel-running or neighboring scenic spot and stored in the map database, setting depending on the user's preference. Since there cannot be a road of zero cost, the reduction coefficient is set to be in the range of, e.g., 0.5 and 1.0.

The operation of the navigation device of the first embodiment will now be described.

Figure 3:
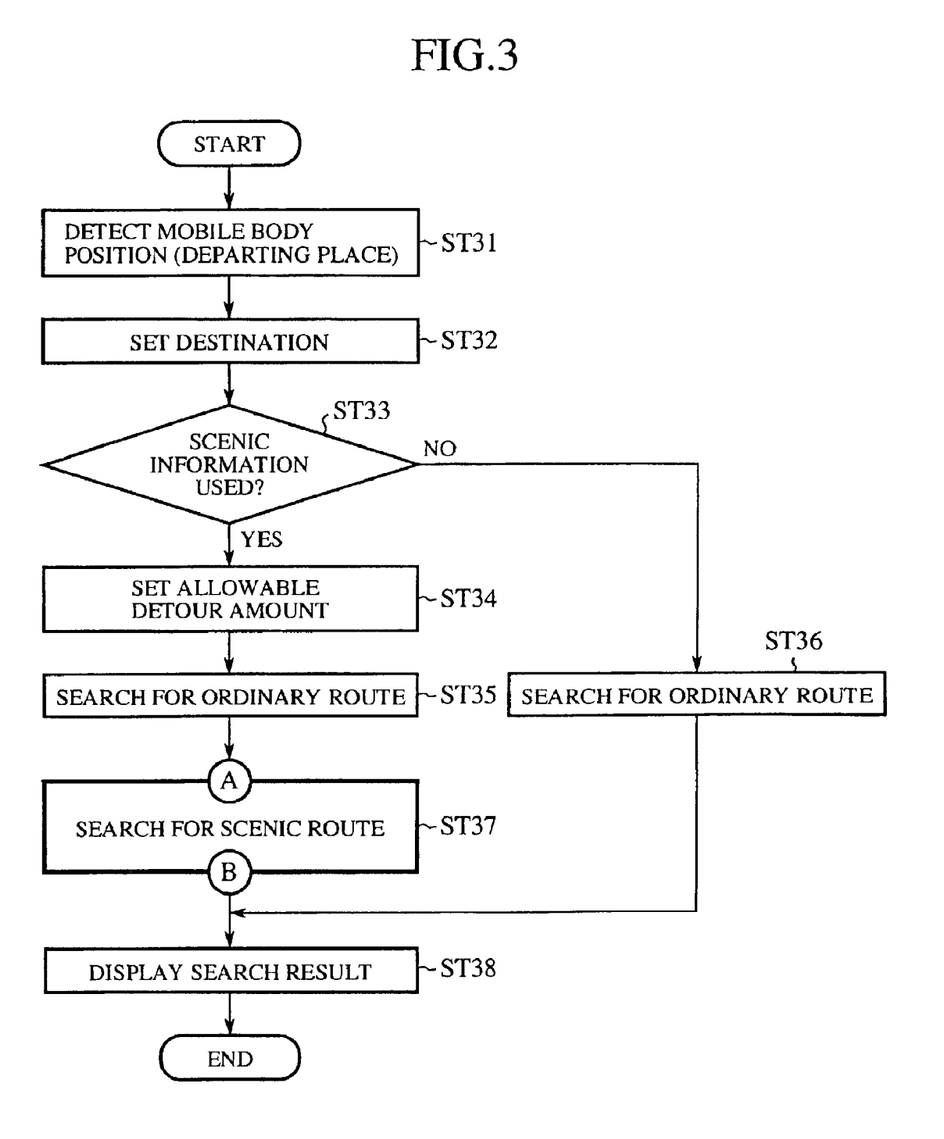
FIG. 3 is a flow chart showing an operation of the navigation device.

FIG. 3 is a flow chart showing the route searching operation of the navigation device in the first embodiment. A description will now be made based on this flow chart.

First, at step ST31, the current position (departing place) of the mobile body is detected by the GPS signals and by map matching or the like utilizing the traveling locus on the road to the current position. At the next step ST32, the setting of the destination is done by the user. At the next step ST33, a judgement is made on the selection made by the user as to whether or not the searching for the scenic road is made. In the case where the searching for the scenic road is not made, an ordinary route that is given the priority to the distance or the time is searched at step ST36 by such simulation as the breadth first search or the Dijkstra algorithm, or the like. In addition, in the case where the search for the scenic road is made, the program proceeds to step ST34 to set an allowable drop-in amount.

Figure 8:
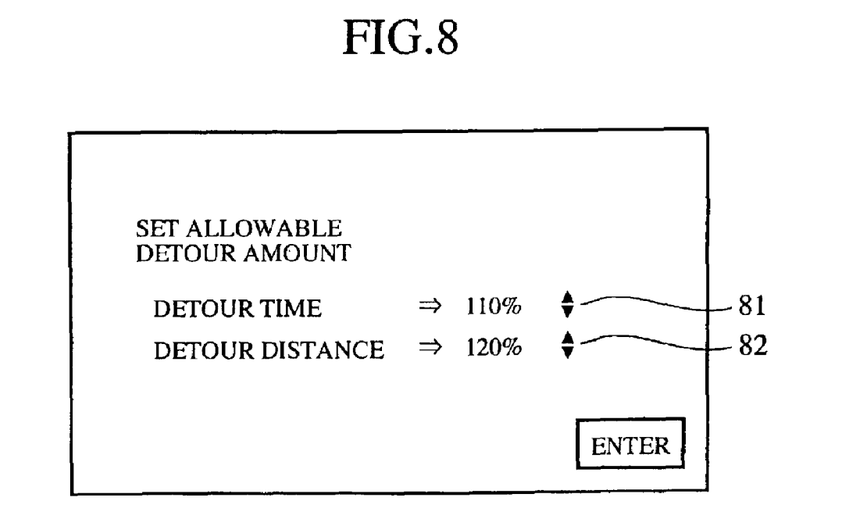
FIG. 8 is a screen for setting an allowable detour amount in the navigation device.

This setting of the allowable drop-in amount is defined as follows. Namely, the degree of allowable range of an increase in the distance and time accompanied by the detour to pass through the scenic spot seems to vary from user to user. Therefore, to what extent an increase in the distance and time is allowable or acceptable for the user is set by confirming on the screen displayed on the display monitor of the navigation device, e.g., shown in FIG. 8. In the screen shown in FIG. 8 the user increases or decreases the ratio of the allowable time by repeatedly pushing an allowable time setting button 81 and increases or decreases the ratio of the allowable distance by repeatedly pushing an allowable distance setting button 82 in the same way. In passing, the percentage display in FIG. 8 is the ratio where the ordinary route that does not follow the scenic route is set to 100%. The display reads that the user allows extended time of 10% as to the detour time and for extended distance of 20% as to the detour distance.

At step ST35, the ordinary route that is given the priority to the distance or time is searched by such simulation as the breadth first search or the Dijkstra algorithm, or the like to thereby find the time required and distance required in the ordinary route. Then, based on the allowable drop-in amount inputted at step ST34 and the scenic information obtainable from the map database in FIG. 6, a search for the scenic route is made at step ST37 every link of the ordinary routes searched at step ST35. At step ST38, a display is made, on the display 15, of the result of search for the route inclusive of the scenic route or the result of search for the ordinary route made at step ST36. As a result, the user can select a route matched to his/her liking from the results of route search.

Figure 4:
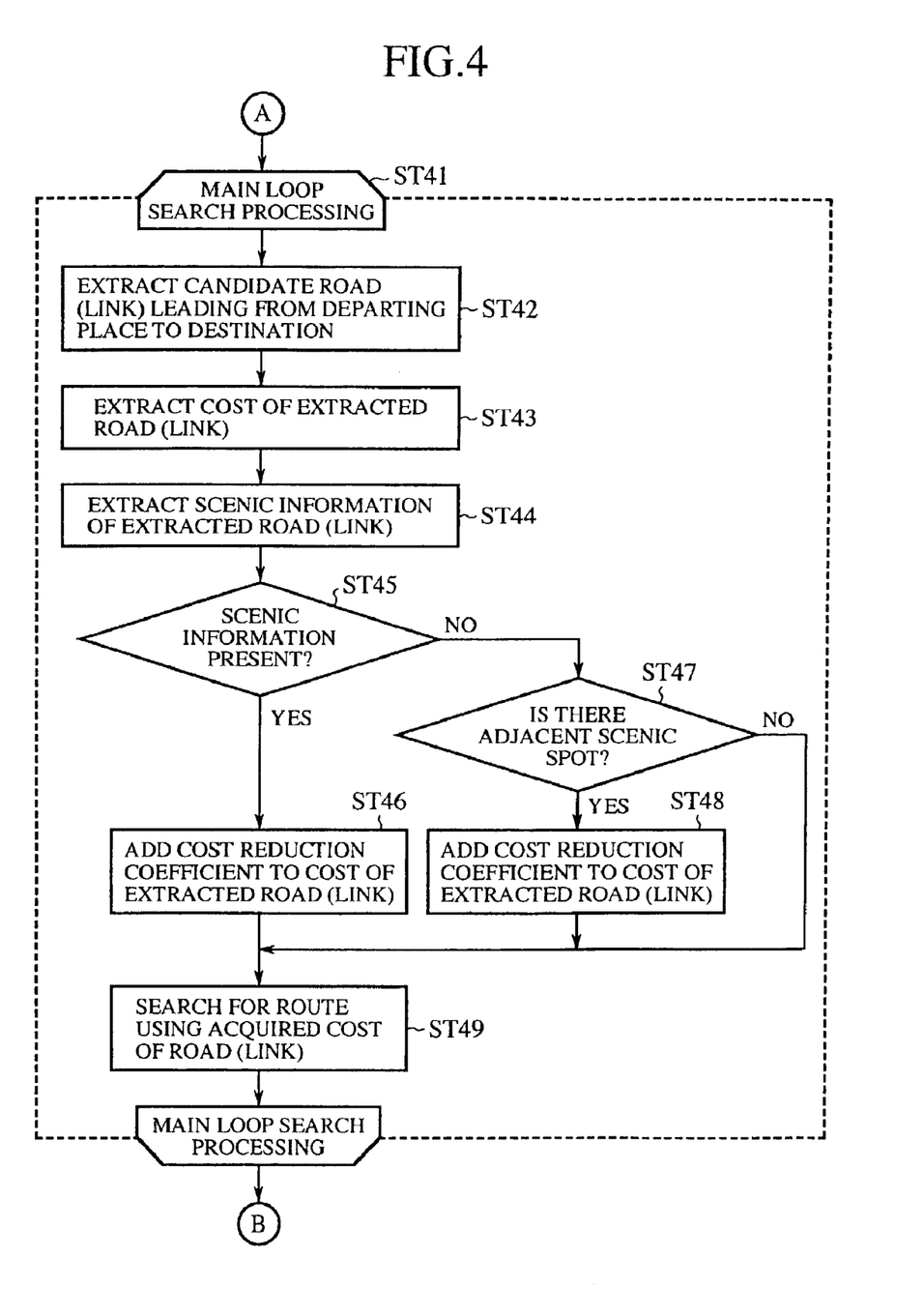
FIG. 4 is a flow chart showing a search for a scenic route in the navigation device.

FIG. 4 is a flow chart showing the details of searching process for the scenic route made at step ST37.

In this flow chart the search for the scenic route is made by the main loop step ST41 inclusive of steps ST42 through ST49. Namely, at step ST42, candidate links leading from the departing place to the destination are extracted by such simulation as the breadth first search or the Dijkstra algorithm, or the like. At the next step ST43, the cost of the candidate link is extracted and, at step ST44, the scenic information of the candidate link is extracted, respectively, from the map database shown in FIG. 6.

At the succeeding step ST45, if the scenic information obtained from the map database in FIG. 6 is "present," i.e., if the scenic flag is "YES", the current date and time are obtained from the GPS signal or the built-in clock in the navigation device, etc. An average passing time of the link is then stored in the map database, and the sum of the passing time required for reaching to all of the links whose scenic flags are "YES" is added to the current time. An estimated arrival time at the link whose scenic information is "YES" can thus be computed.

If the estimated arrival time (time of the day inclusive of year, month, day, date) at the link whose scenic information is "present" obtained at step ST45 is included in the best season/time of scenic information obtainable as to the link from the map database in FIG. 6, the link cost of the link whose scenic information is set to "YES" is reduced at step ST46 by using the cost reduction coefficient obtainable from the database in FIG. 6.

If failed to obtain the scenic information at step ST44 as to the link obtained at step ST42, a search is made for such gas stations and the restaurants in the neighborhood of the current position contained in the recent navigation device, or, by using the positional data such as map database, or the like for searching for the surrounding facilities, a judgement is made at step ST47 as to whether there exists scenic spots such as various landmark towers, castles, or the like, in the surrounding facilities adjacent to the link where the scenic information failed to be extracted.

As a result, if there is an adjacent scenic spot, an estimated arrival time at the link having an adjacent scenic spot is obtained in a similar manner as with step ST46. If the estimated arrival time at the link coincides with the best period/time obtainable from the map database shown in FIG. 7, the link cost is reduced at step ST48 at a ratio corresponding to the cost reduction coefficient depending on the kind of the scenic spot shown in FIG. 7. On the other hand, if the estimated arrival time at the link does not coincide with the best period/time obtainable from the map database shown in FIG. 7, the link cost obtained from the map database is used as it is.

At step ST49, the candidate link cost of the route leading from the departing place to the destination extracted at step ST42 is varied in the following three cases, i.e., the one having scenic information, the one having adjacent scenic spot, and the one having neither of them. By using this coordinated link cost, it becomes possible to search for the scenic route. In this search for the scenic route, there are computed the ratio between the allowable detour time and the allowable detour distance inputted by the user at step ST34, and the allowable detour time and distance from the time required and the traveling distance along the ordinary route computed at step ST35. The route computation is performed within a range not exceeding the allowable detour time and distance.

In this manner, the user is free to choose whichever route he/she likes from a number of routes such as a scenic route obtained by the method of searching for the scenic route, time-priority route or distance-priority route obtained by such conventional method of searching the route as the breadth first search or the Dijkstra algorithm, or the like. This widens the scope of kinds of the routes to be searched for the number of routes.

As the scenic route searched for by the method of searching for the scenic route, the following can be listed, i.e., a noted place of cherry blossoms in spring, a route extending along coasts in summer, a noted place of red leaves in autumn, a noted place of snow scene in winter, a scenic route running through a place where an event will be taken place on Saturdays, Sundays, and holidays, a noted place where one can see the rising sun in the morning, a well-shaded place in the noon, a place where one can see the beautiful sunset in the evening, a place where one can see the beautiful night scene at night.

In addition, as the scenic route selected depending on certain atmospheric conditions detected by the weather sensor 28 such as a thermometer, wind velocity meter, or the like, it is also possible to search the route running through the noted place of snow scene in snowy weather.

Figure 7:
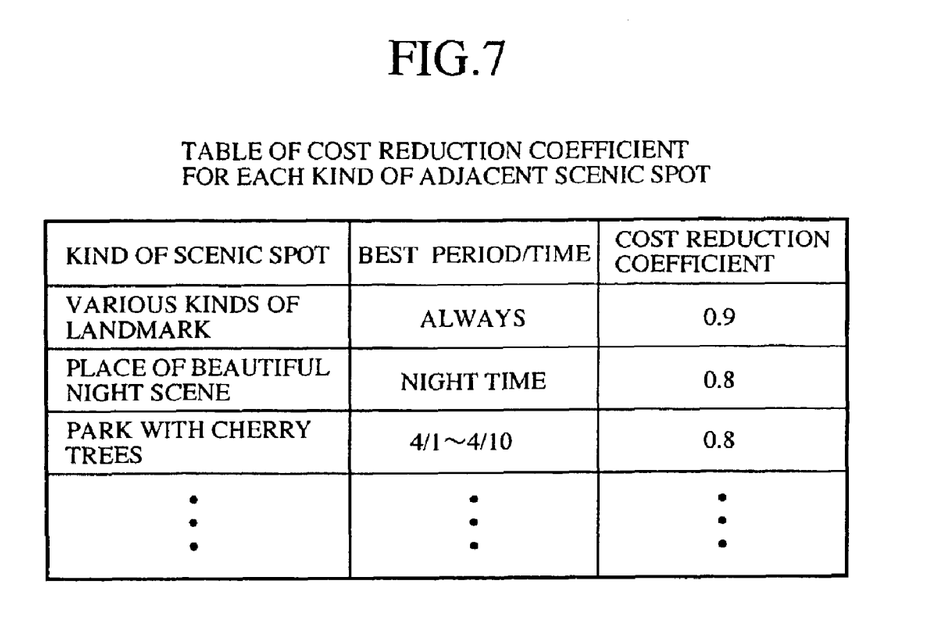
FIG. 7 is a table showing an example of a map format of a map database in which cost reduction coefficients in accordance with the types of scenic spots are stored in the navigation device.

Then, the cost needed in the route search will now be actually computed taking FIGS. 5, 6 and 7 as an example. In the explanatory drawing of the route in FIG. 5, among the routes leading from the node 1 to the node 6, the route leading from the node 2 to the node 5 can be selected from the following three routes, i.e., the route (node 2-node 5), the route (node 2-node 4-node 5), and the route (node 2-node 3-node 5). Suppose that the current date is April 2 and that the vehicle passes through the neighborhood of the node 2 to the node 5 at about 9:00 P.M. Then, in case the method of searching for the scenic route is not applied, the cost of the respective routes will be as follows, i.e., the cost of the route (node 2-node 5) is "90," the cost of the route (node 2-node 4-node 5) is "100", the sum of the cost "50" of the route (node 2-node 4), and the cost "50" of the route (node 4-node 5), the cost of the route (node 2-node 3-node 5) is "100", the sum of the cost "30" of the route (node 2-node 3), and the cost "70" of the route (node 3-node 5). As a result, the least expensive route (node 2-node 5) is searched and adopted.

On the contrary, the cost of the respective routes in case the method for searching the scenic route is applied, the cost of the route (node 2-node 5) is "90" and the cost of the route (node 2-node 4-node 5) is "80", the sum of the cost "40", obtained by multiplying the cost reduction coefficient corresponding to the cherry-tree-lined street and the cost "40" of the route (node 4-node 5), and the cost of the route (node 2-node 3-node 5) is the sum "86" of the cost "30" of the route (node 2-node 3 and the cost "56" of the route (node 3-node 5) obtained by multiplying the cost reduction coefficient corresponding to the night scene.

As a result, the least expensive route (node 2-node 4-node 5) is searched and adopted. If the current date does not coincide with the best period/time in FIGS. 6 and 7, e.g., if it is now 9:00 P.M. in June, the cost of the route (node 2-node 4-node 5) will be "100", the sum of the cost "50" of the route (node 2-node 4), and the cost "50" of the route (node 4-node 5). Therefore, the least expensive route (node 2-node 3-node 5) is searched. If it is now 10:00 A.M. in June, the route (node 2-node 5) will be adopted.

As described above, according to the first embodiment, the navigation device and the method of searching the route can be provided. The device and method enables the user can visit to the drop-in place the route via the drop-in route running through the scenic drop-in place is automatically searched and presented to the user, without manually setting the scenic spot as the destination or as the passing points. Therefore, even if the user is unaware of the scenic spot at which the user wishes to drop in, the user needs only to simply follow the route guidance inclusive of the drop-in place depending on the route guidance conditions inclusive of the place, time, etc.

In other words, according to this invention, without manually setting the desired drop-in place as the destination and the passing points, the user can automatically search for the guide route via the drop-in route running through the favorable place for drop-in adjacent to the guide route leading from the departing place to the destination. In addition, by an increase and decrease in the time and distance within the allowable range, the guide route via the drop-in route to be detoured can be automatically searched. Still furthermore, the guide route via the drop-in route running through the favorable place for drop-in depending on the season, the day of the week or the time period can be automatically searched.

Furthermore, according to this invention, a selection can be made between the search for an ordinary guide route and for the guide route running through the drop-in route.

It is readily apparent that the above-described navigation device and a method of searching route meet all of the objects mentioned above and also has the advantage of wide commercial utility. It should be understood that the specific form of the invention herein above described is intended to be recurrentative only, as certain modifications within the scope of these teachings will be apparent to those skilled in the art.

Accordingly, reference should be made to the following claims in determining the full scope of the invention.

What is claimed is:

1. A navigation device comprising:

position detecting means for detecting a position of a mobile body;

map data acquiring means for acquiring map data;

route searching means for searching for a guide route from the detected position to an input destination based on the acquired map data;

surrounding information searching means for searching for favorable places in proximity to candidate routes from the detected position to the destination based on information in the acquired map data; and output means for outputting route guide information including search results from said route searching means, wherein said route searching means is operable to search for the guide route based on proximity to the favorable places searched for by said surrounding information searching means without any of the favorable places being input as the destination.

2. The navigation device according to claim 1, further comprising input means for setting various parameters, wherein said input means sets a search parameter comprising at least one of an allowable detour distance and time with respect to a determined most direct route to the destination, and wherein said route searching means limits the search for a guide route to candidate routes satisfying the search parameter set by said input means.

3. The navigation device according to claim 1, wherein said input means sets a parameter determining whether or not the route searching means searches for the guide route based on proximity to the favorable places searched for by said surrounding drop-in searching means.

4. The navigation device according to claim 1, wherein said route searching means uses a cost reduction coefficient associated with a favorable place in the acquired map data to reduce a cost proscribed to a candidate route in proximity to the favorable place, thereby facilitating selection of the candidate route as the guide route.

5. The navigation device according to claim 1, further comprising:

calendar information detecting means for detecting calendar information, wherein said route searching means is operable to search for the guide route based on the detected calendar information.

6. The navigation device according to claim 5, wherein said calendar information detecting means detects calendar information including at least one of: current season, day of the week, and current time, wherein said surrounding information searching means searches for the information about favorable places based on the calendar information.

7. The navigation device according to claim 6, wherein the favorable place information in the acquired map data includes a noted place providing at least one of: a view of seasonal blossoms, a view of a coast, a view of red leaves in autumn, and a view of snow-related scenery; a venue for an event on a specific day; a sunrise view, a well-shaded area, a sunset view, and scenery viewable at night.

8. The navigation device according to claim 5, further comprising:

weather detecting means for detecting weather information, wherein said surrounding information searching means searches for the information about favorable places based on the detected weather information and the calendar information, wherein said route searching means searches for the guide route based on proximity to the favorable places searched for by said surrounding searching means.

9. A method of searching for a guide route from a current position to a destination on map data, comprising the steps of:

searching for information about favorable places based on proximity to candidate routes from the current position to the destination based on information set in the map data; and searching for a guide route according to proximity to the favorable places based on results of the searching step without any of the favorable places being set as the destination.

10. The method of searching for a guide route according to claim 9, further comprising the step of setting a search parameter comprising at least one of an allowable detour distance and time with respect to a determined most direct route to the destination, wherein the searching step limits the search for the guide route to candidate routes satisfying the allowable detour distance and time set at the setting step.

11. The method of searching for a guide route according to claim 9, further comprising:

determining current calendar information including at least one of: current season, day of the week, and current time, wherein the searching for information about favorable places searches for the information based on the calendar information.

12. The method of searching for a guide route according to claim 9, further comprising:

detecting weather information, wherein the searching for information about favorable places searches for the information based on the detected weather information and the calendar information.

13. The method of searching for a guide route according to claim 9, wherein the favorable places include at least one of: locations providing a scenic view; landmarks; gas stations; restaurants; and event venues.

14. The method of searching for a guide route according to claim 13, wherein the guide route searching step determines the guide route from a plurality of candidate routes in the map data, the determined guide route being one of the candidate routes at which at least one of the favorable places is located, according to the map data.

15. The method of searching for a guide route according to claim 9, the method being implemented in a navigation device, the method further comprising:

outputting the guide route to the user along with a candidate route determined as a most direct route to the destination; and receiving an input from the user indicating the user's choice between the guide route and the most direct route.

16. The method of searching for a guide route according to claim 9, further comprising:

detecting at least one of current calendar information and current weather information, wherein the guide route searching step includes:

determining which of the favorable places are suitable based on at least one of the current calendar information and the current weather information; and selecting the guide route as a candidate route at which at least one of the suitable favorable places is located, according to the map data.

17. The method of claim 16, wherein the selecting step selects the guide route from a set of candidate routes in the map data that satisfy an allowable detour parameter input by the user, the allowable detour parameter comprising at least one of an allowable detour time and distance with respect to a determined most direct route to the destination.

18. The method of searching for a guide route according to claim 9, wherein the route guide searching step includes, extracting a plurality of candidate routes in the map data;

calculating a cost associated with each of the candidate routes;

reducing the cost associated with each candidate route at which one of the favorable places is located based on the map data, the costs being reduced based on a cost reduction coefficient associated with the favorable place; and selecting the candidate route with the smallest cost as the guide route.

19. A navigation device comprising:

route searching means for searching for a guide route from the detected position to a destination based on acquired map data;

surrounding information searching means for searching for favorable places in proximity to candidate routes to the destination based on the map data and calendar information; and output means for outputting route guide information including search results from said route searching means, wherein said route searching means is operable to search for the guide route based on proximity to the favorable places searched for by said surrounding drop-in information searching means, and wherein the calendar information includes at least one of a determined current season, current time, and day of the week.

* * * * *